(12) United States Patent
Mooser et al.

(10) Patent No.: US 12,172,385 B2
(45) Date of Patent: Dec. 24, 2024

(54) ATTACHING AN OBJECT TO A SUBSTRATE

(71) Applicant: Woodwelding AG, Stansstad (CH)

(72) Inventors: Patrick Mooser, Biel (CH); Jörg Mayer, Niederlenz (CH); Gregor Eckhard, Rüschlikon (CH)

(73) Assignee: WOODWELDING AG, Stansstad (CH)

( * ) Notice: Subject to any disclaimer, the term of this patent is extended or adjusted under 35 U.S.C. 154(b) by 613 days.

(21) Appl. No.: 17/253,375

(22) PCT Filed: Jul. 1, 2019

(86) PCT No.: PCT/EP2019/067627
§ 371 (c)(1),
(2) Date: Dec. 17, 2020

(87) PCT Pub. No.: WO2020/007805
PCT Pub. Date: Jan. 9, 2020

(65) Prior Publication Data
US 2021/0252800 A1    Aug. 19, 2021

(30) Foreign Application Priority Data

Jul. 2, 2018  (CH) .................................... 832/18

(51) Int. Cl.
| | |
|---|---|
| B29C 65/00 | (2006.01) |
| B29C 65/56 | (2006.01) |
| B29L 31/30 | (2006.01) |

(52) U.S. Cl.
CPC ...... *B29C 65/562* (2013.01); *B29C 66/30321* (2013.01); *B29C 66/47* (2013.01);
(Continued)

(58) Field of Classification Search
CPC ... B29C 65/562; B29C 66/3032; B29C 66/47; B29C 66/7392; B29C 66/71;
(Continued)

(56) References Cited

U.S. PATENT DOCUMENTS

2007/0062628 A1* 3/2007 Aeschlimann ........ B29C 65/562
                                                                       156/1

FOREIGN PATENT DOCUMENTS

| CN | 204398471 U * 6/2015 | |
|---|---|---|
| DE | 102016007698 A1 * 12/2017 | ........... B21D 39/031 |

(Continued)

OTHER PUBLICATIONS

English translation of DE102016007698 (Year: 2017).*
English translation of CN204398471U (Year: 2015).*

*Primary Examiner* — Jun S Yoo
(74) *Attorney, Agent, or Firm* — Rankin, Hill & Clark LLP

(57) ABSTRACT

A method of attaching an object to a substrate with a fastener, and an associated fastener. The object is tensible and has an engagement portion. The fastener has a protrusion, which includes thermoplastic material in a solid state. The method includes applying a mechanical pressing force and a mechanical excitation capable to cause a movement of the fastener in a distal direction so that the protrusion penetrates into the substrate and liquefies the thermoplastic material until a flow portion of the thermoplastic material is flowable and penetrates into structures of the substrate. The engagement portion is moved in the distal direction by the movement of the fastener, wherein the movement of the engagement portion in the distal direction causes a tensioning force in the object, and wherein the fastener has a protruding portion extending at least partly into the substrate after the thermoplastic material resolidifies.

32 Claims, 4 Drawing Sheets

(52) U.S. Cl.
CPC .......... *B29C 66/721* (2013.01); *B29C 66/727* (2013.01); *B29C 66/7392* (2013.01); *B29L 2031/30* (2013.01)

(58) Field of Classification Search
CPC ....... B29C 65/06; B29C 65/08; B29C 66/472; B29C 66/7294; B29C 66/8322; B29C 66/30341; B29C 66/73921; B29C 66/834; B29L 2031/30; B29L 2031/729; B29L 2031/3017
See application file for complete search history.

(56) References Cited

FOREIGN PATENT DOCUMENTS

| WO | 00/79137 | 12/2000 | |
|---|---|---|---|
| WO | 2016/198546 | 12/2016 | |
| WO | 2016/198547 | 12/2016 | |
| WO | WO-2016198545 A1 * | 12/2016 | ............. B29C 65/08 |
| WO | WO-2016198547 A1 * | 12/2016 | ............. B29C 65/08 |

* cited by examiner

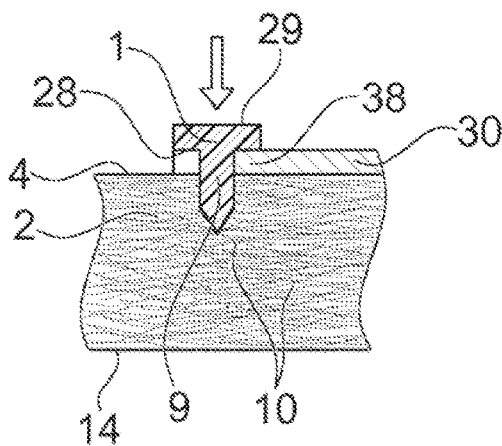
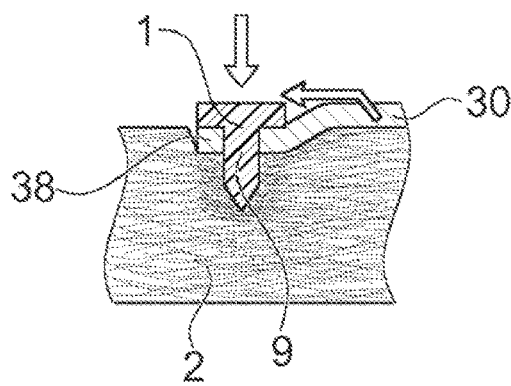
Fig. 1a
Fig. 1b
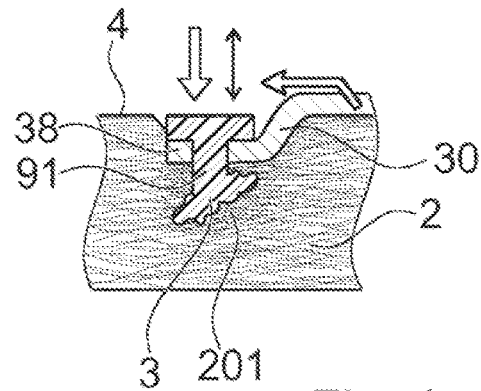
Fig. 1c
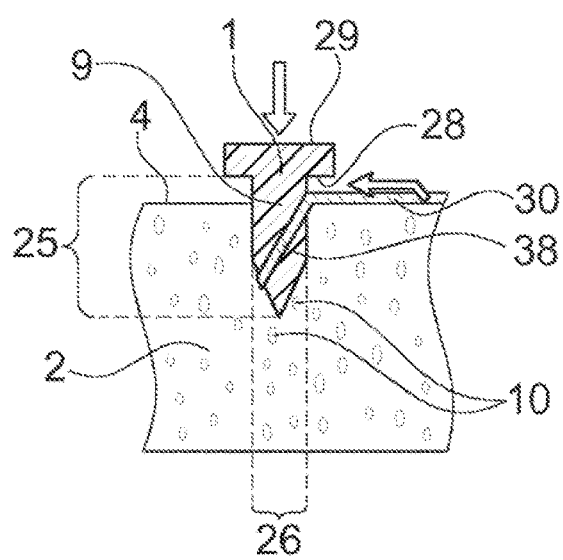
Fig. 2a
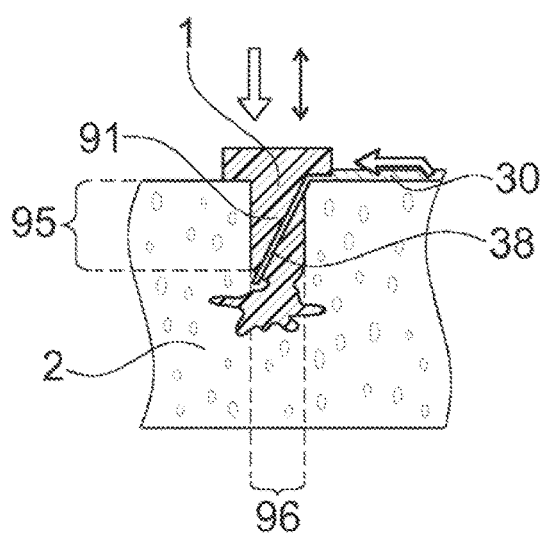
Fig. 2b

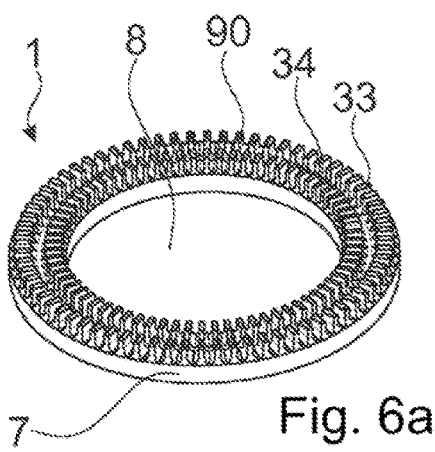
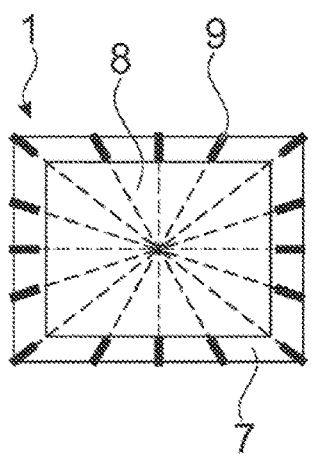
Fig. 6a
Fig. 6b
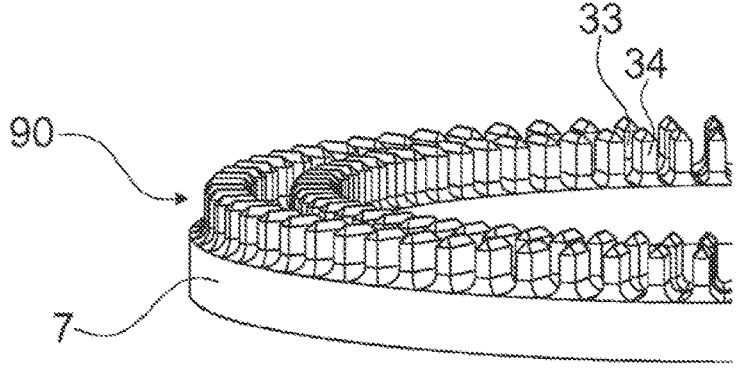
Fig. 7
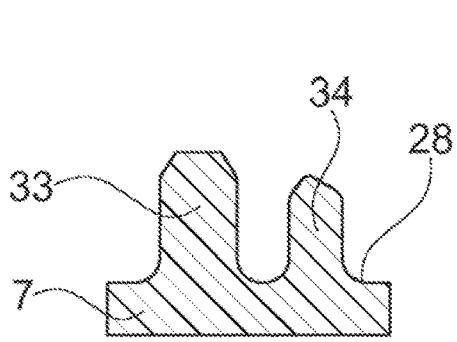
Fig. 8
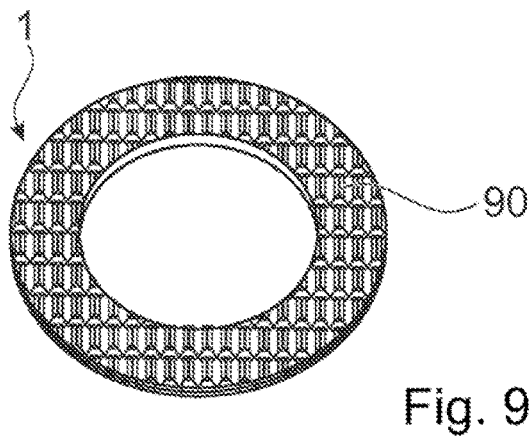
Fig. 9
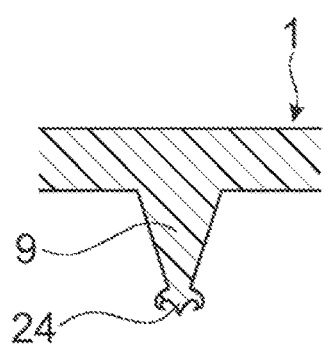
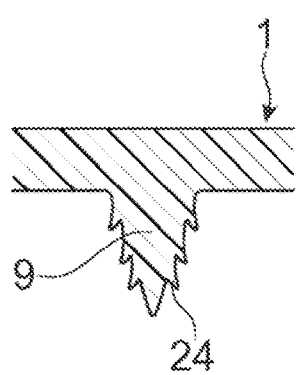
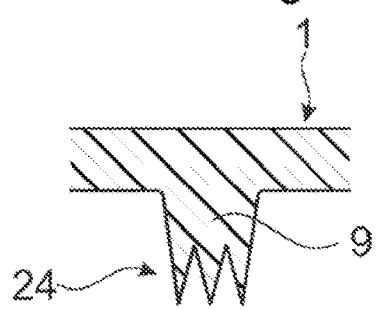
Fig. 10a  Fig. 10b  Fig. 10c

ATTACHING AN OBJECT TO A SUBSTRATE

BACKGROUND OF THE INVENTION

Field of the Invention

The invention is in the field of fastening technology, in particular fastening technology for the interior of means of transport, especially automobiles and aircraft, as well as entertainment technology.

Description of Related Art

Devices used or produced in automotive, aviation and other industries include surfaces that need to fulfil physical demands given by the user or authorities. Such demands concern optical, acoustic, thermal and mechanical properties, in particular. For example, the quality and value of a device is linked to the visual impression given by exterior surfaces, the generation of noise due to vibration of or within the device needs to be limited and/or adapted, and the surface needs to generate a specific feeling and/or a specific resistance against degradation due to use of the device.

Covers that are attached to the surfaces are one approach to meet these demands. Thereby, two methods to attach the cover to the surface directly or to attach a connector to the cover with which the cover can be attached to the surface have prevailed.

A first method uses adhesives. However, adhesives are disadvantageous in terms of long term stability. In particular, if an adhesive is used for the attachment of a cover with or to a porous and/or fibrous surface for example, the stability can be poor because the outmost portions of the fibers and/or pores are embedded in the adhesive and contribute to the bonding, only.

Further, the use of adhesive is time consuming (e.g. due to hardening processes), needs generally the treatment of an extensive area and can be limited to certain body geometries as it is the case for friction welding, for example.

A second method uses fasteners that penetrate the cover, usually. Rivets, nails and screws are example of such fasteners. The use of fasteners as well as related approaches that are based on through going holes produced during the attachment or pre-drilled are disadvantageous in terms of optical, acoustic and/or mechanical properties, at least.

Hence, there is need for alternative methods to bond objects together, in particular to attach covers with specific physical properties to surfaces of devices such as vehicles and machines.

SUMMARY OF THE INVENTION

It is an object of the present invention to provide a method for attaching an object to a substrate, the method overcoming disadvantages of prior art methods.

In particular, it is an object of the invention to provide a method for attaching a tensible object to the substrate in a manner that the object is free from folds, bulges etc. after attachment.

For example, the object can be a cover by itself or it can be a fastening device for another object, in particular a cover. A hook portion of a hook and loop tape, in particular a hook portion of the "Velcro"-type, is an example of an object that is a fastening device.

As pointed out above, the invention relates to fastening technology for the interior of means of transport, for example. The fastening of a doormat (foot mat) and/or of a protective cover, for example on a seat, such as a car seat, or a portion thereof, such as a headrest or a seating surface, or on an otherwise highly exposed surface, for example in a storage area, are examples of applications of the invention, wherein the doormat, the protective cover etc. can be fastened directly on its support (i.e., on a bottom plate, on the seat, on a side wall etc.) or by use of the fastening device, for example by establishing a hook and loop connection.

In this text, "tensible" or "tensile" is used as a generic term for an object that can be attached in a smooth and fitting manner to the substrate (support) by the method and/or by a fastener according to the invention. In dependence of the object, in particular its composition, the object can be at least one of expandable, stretchable, elongable, and extendable.

In this text, the term "tensible" and "tensile" include the meaning of the terms "expandable", "stretchable", "elongable", "extendable" etc.

The object can be expandable.
The object can be stretchable.
The object can be a fabric, in particular a woven fabric.
The object can be elastically deformable.
The object can be inelastically deformable.

It is a further object of the invention to provide a method that causes an attachment of the object to the substrate including deep-effective anchoring for a variety of substrates.

Examples of possible substrates are panels, insulations, sheathings, fairings, trims, carriers, absorbers, and decors for example used in vehicles, such as automobiles, trains and planes, for example in the luggage compartment, in the interior of the vehicle or around a wheelhouse.

In particular, possible substrates can include natural or synthetic fibers, for example cotton or polyester fibers. These fibers can be embedded in a plastic, in particular a thermoplastic material, wherein free ends of the fibers, this means portions of the fibers not embedded in the plastic, can form a surface region of the substrate.

Another example of possible substrates are panels, sheathings, fairings, trims and carriers including for example a functional layer attached to a core. For example, the functional layer can be at least one of soft, softening, damping and curbing, in particular by including a plurality of openings, voids, movable components and/or non-rigid components.

Yet another example of possible substrates are dashboards including a top layer, for example a rigid and/or non-compressible top layer or a top layer made of artificial leather that is arranged on a foam. The foam can become more dense and rigid with increasing distance from the top layer.

A method according to the invention is suitable for attaching an object to a substrate (support). In its basic embodiment, the method includes the steps of:
Providing the object, wherein the object is tensible and includes an engagement portion.
Providing the substrate including a proximal surface.
Providing the fastener, wherein the fastener includes at least one protrusion, wherein the protrusion includes thermoplastic material in a solid state.
Arranging the fastener, the object and the substrate relative to each other in a manner that the engagement portion of the object is between at least a portion of the fastener and the substrate.
Applying a mechanical pressing force and a mechanical excitation capable to cause a movement of the fastener in a distal direction in a manner that the at least one protrusion penetrates the proximal surface of the substrate and to liquefy the thermoplastic material to at least one of the fastener and substrate until a flow portion of the thermoplastic material is flowable and penetrates into structures of the substrate.

Stopping the mechanical excitation and letting the thermoplastic material resolidify to yield a positive-fit connection between the fastener and the substrate.

During the method the engagement portion is moved in the distal direction by the movement of the fastener, wherein the movement of the engagement portion in distal direction causes a tensioning force in the object. This tensioning force has the effect, that the object is stretch over the substrate. This smooths out folds, bulges etc. that may be present in the substrate and/or hinders the appearance of such folds, bulges etc. during the method or during use.

It goes without saying that there is need for at least one attachment location of the object that is in addition to the attachment location established with the method according to the invention in order to establish a tensioning force in the object. The number and arrangement of further attachment locations may depend on the object to be attached to the substrate. Properties of the object, such as its shape and its deformation properties that may be isotropic or anisotropic, may be considered. For example, one further attachment location may be sufficient for a ribbon-like object, wherein objects that expand significantly in all direction, such as circular or rectangular objects, may need at least two further attachment locations, for example two further attachment locations that are arranged in a manner that the attachment location established by the method and the further attachment locations form a triangle that is adapted to the properties of the object, in particular its shape and optionally its deformation properties, and optimized in terms of tensioning forces established in the object for smoothing the object.

The at least one further attachment location can be an attachment location established during the method or established by the method.

For example, the step of providing a fastener may be a corresponding step in which a plurality of fasteners (i.e., at least two) is provided, the step of arranging the fastener may be a corresponding step in which the plurality of fasteners are in addition arranged relative to each other in a manner suitable for establishing the tensioning force in the object during carrying out the method, the step of applying a mechanical pressing force and a mechanical excitation may be a corresponding step capable to cause the movement of the plurality of fasteners and to liquefy their thermoplastic material. The movement and/or liquefaction of the fasteners of the plurality of fasteners may be simultaneous or one after the other. The object provided can include a plurality of engagement portions. The number of engagement portions can be equal or larger than the number of fasteners provided.

Alternatively or in addition, the step of providing a fastener may be a corresponding step in which a fastener including a plurality of protrusions is provided, wherein the protrusions are arranged relative to each other in a manner suitable for establishing the tensioning force in the object during the method. The step of arranging the fastener may be a corresponding step in which a plurality of engagement portions are between different portions of the fastener and the substrate. The portions of the fasteners may be adjacent to the protrusions. The step of applying a mechanical pressing force and a mechanical excitation may be a corresponding step capable to cause the movement of the plurality of protrusions and to liquefy their thermoplastic material. The movement and/or liquefaction of the protrusions may be simultaneous or one after the other. The object provided can include a plurality of engagement portions. The number of engagement portions can be equal to or larger than the number of protrusions.

Alternatively or in addition to a plurality of attachment locations established by the method or during carrying out the method, at least one attachment location can be present prior to carry out the method. In other words, the object and substrate provided are attached to each other at at least one attachment location. However, at least a portion of the tensile object can still be moved relative to the substrate, for example by including at least one region or edge that is not attached firmly to the substrate, and/or it is not stretched, in particular not tightly stretched, over the substrate, for example.

For example, the at least one attachment location present prior to carry out the method can be given by the object being mounted to the substrate, for example by the object being clamped between the substrate and another fixation means. This can be done by a seam, a holding rail, a screw, a nail etc., or another cover, such as a cover, in particular a hard cover, used in the interior of means of transport for covering a basic structure (base frame) of the means of transport. One can also envisage situations in which the object is already mounted to the substrate at at least two essentially opposing sides of the object. In this case, the method can be used to stretch the object over the object in a manner that is follows the shape of the substrate more accurately, for example during draping.

Further, a deep-effective anchoring in the substrate is established during the method by the fastener including a protruding portion extending at least partly into the substrate after the step of letting the thermoplastic material resolidify.

In embodiments, the engagement portion does not differ in its properties, composition, structure etc. from other portions or regions of the object. In other words, the engagement portion can be considered as the portion of the object that is moved in the distal direction by a direct impact of the fastener.

However, one can also envisage to design the engagement portion for engaging with the fastener and/or for causing the tensioning force in the object. In such embodiments, the engagement portion can differ in at least one of its properties, in particular mechanical properties, composition and structure from other portions or regions of the object.

The protrusion or the protrusions can have a variety of designs. In particular, at least one of the shape of the protrusion(s), the number of protrusions and/or the arrangement of the protrusion(s) can be such that the protrusion(s) are equipped for penetrating the proximal surface of the substrate and for causing and maintaining the tensioning force in the object.

For example, the at least one protrusion can be at least one of:
A plurality of protrusions arranged for example in a single row being circular, rectangular, elliptical, U-shaped or T-shaped, for example.
However, one can also envisage to arrange different kinds of protrusions in different rows.
A continuous protrusion, e.g. in the shape of a circle, a rectangle, an ellipse or U-shaped or T-shaped.
A protrusion or a plurality of protrusions arranged to cooperate with another fixation of the object to the substrate, for example another fastener, in particular another fastener of the type provided in the method according to the invention, a holding down device, a seam, a weld, etc., or a fixation given by an object being an integral, but loose portion of the substrate. A lug is an example of such an integral, but loose portion.

In this text, any relative arrangement within the object, the substrate, the fastener, tools, etc. and any relative arrangement between the object, the substrate, the fastener, tools, etc. is given relative to an origin situated in the middle of the fastener. When not otherwise stated, the surface of an item (for example, the object, the substrate or a tool) that is arranged closest to the origin is called the proximal surface of the item and a corresponding surface of the item, for example a corresponding surface arranged on the opposite side of the item, is called the distal surface. In the case of the fastener, the surface directed to a proximal surface of an item to which the fastener is to be set in contact and/or—as the case may be—to be bonded is called the distal surface of the fastener. In other words, proximal surfaces are always set in contact and/or—as the case may be—bonded to distal surfaces during the method. Consequently, the protrusion(s) is/are arranged distally on the fastener.

In an embodiment, the fastener does not penetrate the object. In particular, the fastener does not penetrate the engagement portion. In particular, the protrusion does not penetrate the engagement portion.

In an embodiment, the step of applying the mechanical pressing force and the mechanical excitation includes a first sub-step in which a mechanical pressing force is applied that is suitable to cause the protrusion to penetrate the proximal surface and to penetrate into the substrate. No mechanical excitation or a mechanical excitation that does not cause a liquefaction of the thermoplastic material can be applied during the first sub-step.

In this embodiment, the step of applying the mechanical pressing force and the mechanical excitation can include a second sub-step in which the mechanical pressing force and the mechanical excitation applied are suitable to liquefy the thermoplastic material.

The mechanical pressing force applied during the first sub-step can be different from the mechanical pressing force applied during the second sub-step.

In particular, the first sub-step is prior to the second sub-step. Further, the engagement portion can be engaged with the fastener at least during the first sub-step in a manner that the engagement portion is moved in the distal direction.

In an embodiment, in particular in an embodiment in which the step of applying the mechanical pressing force and the mechanical excitation includes the first and second sub-steps, the engagement portion can engage with the protrusion in a manner that the engagement portion penetrates the proximal surface. Such an engagement can be established in particular, but not only, in combination with a proximal surface of the substrate that is not compressible.

For example, at least a portion of the engagement portion can be woven and/or can include a lug in order to generate the engagement between the engagement portion and the protrusion. The engagement can be such that the engagement portion is not pierced, cut, etc.

In an embodiment, at least the proximal surface of the substrate is made of a material that is not compressible. In particular, this means that at least the proximal surface is rigid. For example, at least the proximal surface is made of wood, a chipboard, a hardened (cured) foam, or a metal sheet.

Alternatively, at least the proximal surface of the substrate is made of a material that is compressible. For example, at least the proximal surface can include or consist of fibers.

In embodiments, in which at least the proximal surface of the substrate is compressible, the engagement portion can engage with the fastener in a manner that a penetration of the proximal surface by the engagement portion is prevented. In this embodiment, the tensioning force bases on a more pronounced compression of the substrate in the region in which the fastener is arranged compared to other regions in which the object is arranged only. This allows for the engagement portion moving further in distal direction then portions of the objects that do not belong to the engagement portion and hence for the generation of the tensioning force in the object.

Additionally, fastener and engagement portion can be adapted to each other in a manner that the engagement portion is not penetrated by the fastener, too.

In an embodiment, the fastener provided includes a hold-down structure. The hold-down structure is in particular suitable in embodiments in which the tensioning force bases on a more pronounced compression of the substrate in the region in which the fastener is arranged compared to other regions in which the object is arranged only and in with optionally the object or its engagement portion(s) at least must not be penetrated by the fastener.

The hold-down structure can be or configured to act as tension structure. The shape of the tension structure can depend on the shape of the fastener. For example, it can be a tension ring in case the fastener is a fixation ring or a tension bar (rail) in case the fastener is a fixation bar (rail).

The hold-down (tension) structure can be an extended structure, such as a ridge.

The hold-down (tension) structure can be arranged relative to the protrusion(s) in a manner that it can be arranged towards an interior of the object whereas the protrusion(s) are arranged to an exterior of the object, in particular towards an adjacent edge.

The fastener can include a fastener body from which the protrusion(s) and the hold-down (tension) structure(s) extend. In particular, they can extend essentially in the same direction.

The protrusion(s) can extend further in the distal direction than the hold-down (tension) structure(s).

In embodiments, the method can include at least one of:
The step of applying the mechanical excitation includes applying mechanical oscillations along an axis that runs at an angle to the proximal surface of the substrate. For example, the axis can run perpendicular to the proximal surface.
The fastener provided includes a fastener body and at least one protrusion distally of the fastener body, wherein the protrusion forms a distal end of the fastener and includes the thermoplastic material in a solid state.
In particular, the fastener can include a protrusion region distally of the fastener body, wherein the protrusion region includes a plurality of protrusions that include the thermoplastic material.
A first fastener, a second fastener and an object including a first engagement portion and a second engagement portion. In this embodiment, the first and second engagement portions can be moved simultaneous in distal direction in a manner that the tensioning force in the object is generated.
Alternatively, an attachment of the first engagement portion by the first fastener is established prior to the step of applying the mechanical pressing force and—as the case may be—the mechanical excitation to the second fastener in order to move the second engagement portion in the distal direction.
Embodiments including at least the first fastener and the second fastener as well as at least the first engagement portion and the second engagement portion are examples of a method including a step of providing discrete points of tensioning force generation.

The number of fasteners, the design of the fastener(s) and/or the arrangement of the fastener(s) relative to the object can be adapted to anisotropic deformation properties of the object.

For example, the object can be tensible along a first direction but not tensible or tensible in a reduced manner along a second direction. In this case, the fastener can include a plurality of protrusions that are arranged to cause a tensioning force along the first direction, but not along the second direction.

The design of the fastener can be given by at least one of the design of the at least one protrusion, the number of protrusions and the arrangement of the at least one protrusion, for example.

In an embodiment, the method includes a step of changing a compressive strength of a region of the substrate.

In particular, the region of the substrate includes at least partly the region into with the protrusion penetrates due to its movement in distal direction.

In this context, the term "compressive strength" is referred to the maximal force per square millimetre generated by an area before said area is displaced, this means before the material defining said area is (further) compressed. Hence, the compressive strength can also be seen as a resistance against further compression or as a stiffness.

The compressive strength corresponds to the stress as measured in a stress-strain experiment, for example.

The change in compressive strength (stress) can be such that the mechanical pressing force and the mechanical excitation applied can cause the liquefaction of the thermoplastic material. In other words, the region of the substrate into with the protrusion penetrates due to its movement in distal direction can be such that it is not able to provide the compressive strength needed to liquefy the thermoplastic material in the step of applying the mechanical pressing force and the mechanical excitation without a change of the compressive strength.

In particular, the mechanical properties of the region can be such that liquefaction of the thermoplastic material is not possible when the mechanical pressing force and the mechanical excitation is applied for less than 15 s or less than 10 s, for example less than 5 s or 2 s. In particular, the mechanical properties can be such that no liquefaction of the thermoplastic material sets in when the mechanical pressing force and the mechanical excitation is applied for 0.1 to 1 s, for example for 0.1 to 0.5 s.

The step of changing the compressive strength of the region of the substrate at least locally can be carried out until a critical compressive strength is generated, this means until the compressive strength needed to liquefy the thermoplastic material with the mechanical pressing force and the mechanical excitation applied is reached.

The change of the compressive strength needed to cause liquefaction of the thermoplastic material in the step of applying the mechanical pressing force and the mechanical excitation can depend on the mechanical pressing force and the mechanical excitation applied.

In particular, the change in compressive strength is an increase in compressive strength.

In many embodiments, the increase in compressive strength is caused by an at least local compression of the substrate. In other words, the method can include a step of compressing the substrate locally. The compression can be to such an extent that a critical density needed for the liquefaction of the thermoplastic material is generated. In particular, the compressive strength can depend on an at least local densification of the substrate, wherein said densification is caused by the compression.

The critical density can correspond to the density at which a critical compressive strength for liquefaction is established.

The substrate can be compressed at least locally by the mechanical pressing force applied for liquefying the thermoplastic material.

In the step of applying the mechanical pressing force and the mechanical excitation for liquefying the thermoplastic material, the mechanical excitation can be applied, this means switched on, after the at least local compression of the substrate has caused an increase of the compressive strength that is sufficient for the liquefaction of the thermoplastic material with the mechanical pressing force and the mechanical excitation applied.

The step of changing the compressive strength at least locally or the step of compressing the substrate at least locally can make the method suitable for attaching the object to the substrate by the positive-fit connection between the fastener and substrate, wherein it is the change of the compressive strength and/or the compression that enables the substrate to form the positive-fit connection by the method.

In embodiments, the substrate or the region of the substrate in which the fastener is to be anchored by the method is formed by an essentially incoherent material, this means a material including constituents that interact weakly only, for example when exposed to an external force such as a compressing force.

A material including or consisting of fibers that are under an applied force movable relative to each other to some extend is an example of an incoherent material.

There is no need that the weak interaction between the constituents is present in the substrate as provided. Rather, said weak interaction can be a result of a force acting on the substrate during the method. Such a force can cause a breakup of a connection between the constituents. For example, the material can include fibers that have locally been connected by a binder material, e.g., a resin powder or melt-fibers combined with a heat treatment, to define a specified density of the material.

In many embodiments, a protruding portion means that there is a portion of the protrusion left after the step of letting the thermoplastic material resolidify, wherein the portion, this means the protruding portion, is not restricted to the outmost region of the substrate, but extends into the volume of the substrate. Being left means that the material defining the protruding portion has not penetrated into the structures of the substrate.

How far the protruding portion penetrates into the substrate depends on the application.

In order to cause deep-effective anchoring, the protruding portion after the step of letting the thermoplastic material resolidify can extend to a depth in the substrate that is larger than a maximal thickness, in particular a maximal diameter, of the protruding portion. This means that the ratio between the depth up to which the protruding portion extends in the substrate and the diameter of the protruding portion is at least 1, in particular between 1 and 5, for example between 1.5 and 4 or between 2 and 3.

In other words, the penetration depth of the protruding portion normal to the proximal surface of the substrate can be larger than an extension, in particular a maximal extension, of the protruding portion in a direction parallel to the proximal surface of the substrate in embodiments. This means, the ratio between the extension normal to the proximal surface and the extension parallel to the proximal surface can be at least 1, in particular between 1 and 5, for example between 1.5 and 4 or between 2 and 3.

The shape of the protrusion can be given by its extension in distal direction (this means its length) and its extension in a direction normal to the distal direction (this means by its thickness or—as the case may be—its diameter). The protrusion can be capable to cause deep-effective anchoring by having a ratio between its extension in distal direction and its thickness of at least 1, in particular between 1 and 5, for example between 1.5 and 4 or between 2 and 3.

In particular, the protrusion(s) used in embodiments of the invention are not energy directors as described below because they form the protruding portion(s) after resolidification. In contrast to this, energy directors do not form such protruding portions because they define positions at which liquefaction sets in which also means that they disperse during the step of applying the mechanical pressing force and the mechanical excitation.

However, the protrusion(s) can include energy directors.

In embodiments, in particular in embodiments of the method including the step of changing a compressive strength of a region of the substrate and/or the step of compressing a region of the substrate, the region being compressible along an axis along which the mechanical pressing force is applied during the step of applying the mechanical pressing force and the mechanical excitation, the compression can lead to a reduction of a thickness of said region by 10-90% for example, wherein the thickness is measured along the axis at which the mechanical pressing force is applied. In particular, the thickness can be reduced by 30-90%, for example by 60-80%, or by 20-80%, for example by 30-70%.

A compression ratio is another measure for the compression of the region that is compressed during the method and/or in which the compressive strength is changed during the method. In particular, the compression ratio is an appropriate measure when local compression is considered. The compression ratio in the region neighboring the protrusion can be between 1.1 and 10, in particular between 1.25 and 5, for example between 1.4 and 3.3.

The material or material composition forming the region can be such that it can be locally compressed. For example, a local mechanical load, e.g., generated by the protrusion of the fastener, can cause the local compression of the region.

The local and/or a "global" compression of the region can be an elastic compression or predominantly elastic compression. This means, the compression relaxes (disappears) after removing the mechanical load causing the compression or relaxes mostly. In other words: the substrate provided can be elastically deformable. The applicability of the attaching method also to substrates that are elastically compressible is an important advantage over known methods that work with hard, this means not compressible, substrates or on substrates including portions that deform plastically, this means irreversible, only, for example hollow core boards (HCB).

The compression can lead to an increase in compressive strength.

In embodiments, the substrate may be a composite and the structures of the substrate may be formed inherently by said composite. For example, the structures can be pores, voids, channels etc.

For example, the substrate can include or consist of fibers, textiles, foam, porous materials, cardboard etc. It can be formed by a sequence of layers, wherein some of the layers can be at least one of rigid, non-compressible, dense (in the meaning of having a low concentration of pores, voids, channels etc.), and load-bearing.

The substrate and/or layers that form the substrate can have a composition that is position dependent. In addition or alternatively, the sequence of layers can be position dependent.

In embodiments, the mechanical excitation can set in after, prior to or at the same time of applying the mechanical pressing force. A mechanical pressing force that sets in prior to the mechanical excitation can be favourable in terms of bonding quality, in particular in terms of bonding depth and strength of the bonding generated. However, one can envisage configurations in which the mechanical excitation can help to optimize the penetration behaviour of the protrusion(s). Some of these configurations are discussed below.

The mechanical pressing force can last for a time sufficient for resolidification of the thermoplastic material after stopping the mechanical excitation.

The mechanical pressing force can vary during the step of applying the mechanical pressing force and the mechanical excitation and—as the case may be—during resolidification of the thermoplastic material.

The thermoplastic material of the fastener is capable of being made flowable by absorption of the mechanical energy generated by the mechanical excitation, in particular mechanical oscillations/vibrations while the fastener is pressed against the substrate. For example, the mechanical vibration energy can be coupled through the fastener and/or the substrate to an interface of the thermoplastic material and material of the substrate. At the interface, external and possibly also internal friction will cause thermoplastic material to heat and become flowable. Flowable thermoplastic material will then be pressed into the structures of the substrate due to the pressure applied.

Portions of the fastener and/or the substrate that form the interface can include a profile that may serve as an energy director, i.e., the energy absorption and heat generation will automatically be focused on or around the respective interface.

Experiments have shown that in particular incoherent materials, such as panels made from a fibrous material, show a surprising stress-strain behaviour when a force (load) is applied locally to such a material. "Locally" in this context means that the force (load) is applied to an area of an item formed by the incoherent material, the area being significantly smaller that a corresponding extension of said item.

The following behaviour has been found on a variety of items of incoherent materials when a pressing force is applied locally and normal to the item:

An approximately linear dependence of the stress on strain can be observed as soon as strain is applied to the item. The roughly linear dependence forms a first region of linear dependence. The linear dependence of the stress on strain in the first region can be approximated by a straight line having a first slope.

A transition region in which the dependence of stress on strain increases steadily follows the first region of linear dependence when strain is further increased.

A second region of approximately linear dependency of stress on strain follows the transition region when strain is even further increased. The roughly linear dependence of the stress on strain in the second region can be approximated by a straight line having a second slope, wherein the second slope is larger than the first slope.

In the experiments, the pressing force (load) was applied by an intender having a relevant surface area between 4 and 200 mm². However, there is no hint that the behaviour summarized above is restricted to this range of relevant surface areas.

Due to this behaviour, a broad range of incoherent materials are surprisingly suitable for use in bonding methods, in particular for use as substrates, relying on the liquefaction of thermoplastic material by the use of a mechanical pressing force and a mechanical excitation, in particular vibrations. This is because a broad range of incoherent materials reach the stress level needed for liquefaction of the thermoplastic material, i.e., the critical compressive strength, thanks to the existence of the second region of linear dependency, only.

Hence, the step of compressing the substrate locally can be such that a compressed region is in the second region of linear dependency. In other words, the stress-strain behaviour of the material of the compressed region is in the second region of linear dependency.

The strain value at which the first and second slope cross in a stress-strain diagram is a characteristic value of the stress-strain behaviour observed.

The step of compressing the substrate at least locally can be such that the material is compressed to the characteristic value, at least.

Alternatively or in addition, the characteristic value can define a lower threshold for applying, this means switching on, the mechanical excitation used in the step of applying the mechanical pressing force and the mechanical excitation capable to liquefy the thermoplastic material. In other words, the mechanical excitation can be switched on at an applied pressing force that causes said characteristic strain value.

Further, it has been observed that the deformation of the items of incoherent materials is largely reversible as long as liquefied thermoplastic material that has been pressed into pores, openings, etc. of the item does not prevent the item from returning to its original shape.

However, there can be configurations in which the deformation of the item is irreversible, for example if the energy coupled into the item is high enough to cause a permanent densification. For example, the item density can include fibers that melt during the method.

Any permanent deformation can be advantageous in terms of bonding strength.

These findings concerning items of incoherent materials can also be observed in corresponding substrates used in the method.

In particular with incoherent materials, the critical density can be established around the protrusion(s) only, for example by a local increase of the global compression by an amount sufficient to reach the critical density.

In an embodiment, the protrusion(s) can include a structure designed and arranged to promote local compression of the substrate when the protrusion(s) is forced into the substrate.

The structures designed and arranged to promote local compression can have at least one of the following effects:
  Material of the substrate, for example fibers, is pulled in distal direction when the fastener is pushed into the substrate. This can lead to the additional effect of felting, in particular if the substrate includes fibers.
  Material of the substrate is embedded in the structures and hence in the protrusion(s). This leads to a more even distribution of load acting on the bond between the fastener and substrate in use.
  The quality of the embedment can be increased if the substrate includes thermoplastic material such that a weld is formed between the structure or the protrusion in general and the substrate and/or such that the substrate changes is structural properties.

For example, the fastener can include at least one barb, for example a barb in the shape of a catching barb and/or a drag down barb. The barb can be significantly smaller than the protrusion or it can have a size such that the barb contributes to the overall shape of the protrusion. In the latter case, the cross-section of the protrusion in a plane perpendicular to a longitudinal axis of the protrusion (also called protrusion axis) can depend significantly on the shape of the barb and/or it can depend on the position of said plane due to the presence of the barb, for example.

Multiple tips arranged with or without offset along the protrusion axis are further examples of structure designed and arranged to promote local compression Such a barb or structure in general can be arranged to increase the density faced by the penetrating protrusion, for example by collecting fibers. In other words, the barb makes sure that the density in front of the protrusion increases in dependence of the penetration depth.

In embodiments, the mechanical pressing force and the mechanical excitation are applied locally to the at least one of the fastener and the substrate. In other words, the fastener or the fasteners are bonded to the substrate at bonding locations that are separate from each other, i.e., the bonding is generated by the use of bonding points and not by a continuous extensive bonding area.

For example, the bonding locations can be round, elliptic, rectangular or square having a characteristic length that is significantly smaller than a characteristic extension over which the object and the substrate and/or—as the case may be—the fastener and the substrate are to be bonded together. In particular, the characteristic length is between a few millimeters to a few centimeters, for example between 1 mm and 10 cm, in particular between 1 mm and 5 cm, for example 0.5 mm, 1 cm, 2 cm, 3 cm, 4 cm or 5 cm. However, one can envisage situations in which a characteristic length of more than 10 cm are needed, for example if the fastener forms a closed or partly closed form with a central opening.

In such embodiments, the step of applying the mechanical pressing force and the mechanical excitation and the step of stopping the mechanical excitation and letting the thermoplastic material resolidify is repeated several times at different positions on at least one of the fastener or the substrate.

It is an advantage of this embodiment that there is no limitation concerning the shape of at least one of the object, the fastener and the substrate as long as they can be arranged to form an assembly of the fastener, the substrate and the object including bonding locations and as long as these locations are accessible for a tool used to apply the mechanical pressing force and the mechanical excitation.

In particular, there is no need that the fastener and/or substrate and/or object is/are essentially flat. Rather, at least one of them can be non-flat (non-plane), for example curved. Further, there is no restriction concerning the position of the bonding location with respect to each other. For example, there is no need that the bonding locations are arranged on a plane or on planes that run parallel to each other.

The method, in particular the method according to the embodiment including the local application of the mechanical pressing force and the mechanical excitation, is suitable for draping.

In particular, the method is suitable draping the substrate with the object.

An example of a tool equipped to apply the mechanical pressing force and the mechanical excitation is a handheld sonotrode or a sonotrode mounted on a robot arm.

The proximal end of the fastener can include a coupling-in face equipped for receiving the mechanical pressure force and the mechanical excitation. The coupling-in face after the step of arranging the fastener, the object and the substrate relative to each other can be arranged parallel to the proximal surface or the portion of the proximal surface defining the bonding location.

In an embodiment, the fastener provided includes the coupling-in face and the method further includes the steps of providing a sonotrode including a coupling-out face adapted to the coupling-in face and of bringing the coupling-out face in contact with the coupling-in face prior to the step of applying the mechanical pressing force.

Alternatively, the substrate, in particular a distal surface of the substrate can include the coupling-in face. In other words: The mechanical pressing force and the mechanical excitation needed to liquefy the thermoplastic material can be applied to the distal surface of the substrate.

In an embodiment, the fastener, the substrate, the object and the sonotrode can be arranged relative to each other such that the substrate is between the fastener and the sonotrode and such that the proximal surface of the substrate is in contact with the at least one protrusion or gets in contact with the at least one protrusion during the method.

The mechanical pressing force and the mechanical excitation can be applied to the distal surface of the substrate by use of the sonotrode. In this embodiment of the method, the distal surface of the substrate is an exposed, "proximal" surface for a user that operates the sonotrode due to the fact that the surfaces of the items are defined relative to an origin in the middle of the fastener.

In embodiments in which the sonotrode is applied to the substrate, the method can include a step of compressing the substrate, for example the step of compressing a region of the substrate. In particular, the compression can be such that the substrate becomes capable to transmit the mechanical excitation applied to the distal surface of the substrate.

The surprising stress-strain behaviour discussed above makes a broad range of incoherent materials suitable for transmitting the mechanical excitation used in bonding methods relying on the liquefaction of thermoplastic material by the use of a mechanical pressing force and mechanical excitation, in particular vibrations. Again, this is because a broad range of incoherent materials reach the stress level needed for transmitting the mechanical excitation thanks to the existence of the second region of linear dependency, only.

Hence, the step of compressing at least a region of the substrate can be such that the stress-strain behaviour of the material of the region is in the second region of linear dependency and/or such that the material is compressed to the characteristic strain-value given by the crossing of the first and second slope.

In embodiments in which the sonotrode is applied to the fastener, the step of applying the mechanical pressing force and the mechanical excitation can be done by the sonotrode being pressed against the coupling-in face of the fastener while the substrate may be optionally held directly or indirectly by a support.

Optionally, the method can further include the step of locking the fastener to the sonotrode after the step of bringing the coupling-out face in contact with the coupling-in face. The sonotrode can be a ring-sonotrode.

In embodiments the protrusions can consist of the thermoplastic material or the thermoplastic material can be arranged at least partly around a core of a harder material. In this context, a harder material means a material that does not become flowable due to the mechanical pressure force and mechanical excitation applied.

The harder material can be a plastic different from the thermoplastic material or metallic, for example.

In particular, a tip or ridge of the protrusion(s) being in contact with the substrate after arranging the fastener, the object and the substrate relative to each other can be made of harder material that is not covered by the thermoplastic material.

Alternatively, at least one of the distal end of the protrusions, a step, and an edge can include the thermoplastic material. In such embodiments, the protrusions form energy directors by their shape. This means, that they define one or more spots where the liquefaction of the thermoplastic material sets in.

Energy directors are structures at which the mechanical oscillations and/or pressure force applied are focused and/or couple into the thermoplastic material in an efficient manner.

It is a further insight of the invention that both protrusion(s) including the thermoplastic material in a solid state and protrusion(s) consisting of the thermoplastic material can be used to pierce layers of various materials and dimensions, in particular solid cover layers of the substrate, by optimizing the mechanical pressing force, the mechanical excitation and the onset of the mechanical excitation relative to the onset of the mechanical pressing force.

In an embodiment, the method can include the step of piercing a proximal cover layer of the substrate before the mechanical pressing force and the mechanical excitation capable to liquefy the thermoplastic material is applied. However, this does not imply that no mechanical pressing force and/or mechanical excitation is applied during the step of piercing.

Experiments have shown that various cover layers can be pierced, for example metal sheets, such as titanium sheets of a thickness (strength) of up to 0.3 mm and aluminium sheets of a thickness of up to 0.5 mm.

In an embodiment, the object provided includes the object proximal surface and the object distal surface. The embodiment includes further the method in its basic configuration or in any embodiment disclosed and the further steps of:

Arranging the object relative to the substrate such that the object distal surface is in physical contact with the proximal surface of the substrate.

Arranging the fastener relative to the object and the substrate such that the protrusion is at least partly in contact with the proximal surface of the substrate and such that a distal surface of the fastener is in contact with the object proximal surface.

In particular, the portion of the object proximal surface that is in contact with the distal surface of the fastener can be the engagement portion.

This embodiment of the method is in particular advantageous in cases in which the object cannot be penetrated by the protrusion(s).

This embodiment of the method is further advantageous in cases in which the object should not be penetrated, for example because a penetration reduces its stability significantly. For example, the location of a complete penetration can be the starting point of a tear.

For example, this embodiment of the method can be used to fix an object being the hook portion of a hook and loop tape, in particular a hook portion of the "Velcro"-type, to the substrate.

In this embodiment, the protrusion and the distal surface of the fastener that is put in contact with the object proximal surface are designed such that the flowable portion of the thermoplastic material can penetrate into the structures of the substrate during the step of applying the mechanical pressing force and the mechanical excitation and such that the distal surface of the fastener is not able to penetrate the object and hence to come thereby in contact with the substrate during the step of applying the mechanical pressing force and the mechanical excitation.

For example, the distal surface of the fastener that is put in contact with the object proximal surface is flat. This means that the object is fixed to the substrate by a clamping force generated by the fastener.

However, the distal surface of the fastener that is put in contact with the object proximal surface can be a distal surface of a protrusion of the fastener, for example a distal surface of a hold-down structure (a tension structure) as disclosed above.

In this case, the protrusion that is put in contact with the proximal surface of the substrate during the step of arranging the fastener relative to the object and the substrate can be a first protrusion and the protrusion that includes the distal surface of the fastener that is put in contact with the object proximal surface can be a second protrusion of the fastener.

In particular, the first protrusion can be a protrusion of a first kind including the thermoplastic material and the second protrusion can be a protrusion of a second kind including the thermoplastic material. The shape of the protrusion of the first kind can be such that the flowable portion of its thermoplastic material penetrates into the structures of the substrate, wherein the shape of the protrusion of the second kind can be such that a flowable portion of its thermoplastic material penetrates into structures of the object during the step of applying the mechanical pressing force and the mechanical excitation capable to liquefy the thermoplastic material.

However, the protrusion of the second kind can be designed to not penetrate the object from it proximal to its distal surface. Rather, structures of the object are embedded in thermoplastic material of the protrusion of the second kind after re-solidification.

For example, the object includes or is the hook area of the hook portion of the hook and loop tape.

The distal surface of the fastener and the portion of the object proximal surface, in particular the engagement portion, that are put in contact with each other can include means to engage with one another, in particular means to engage before applying the mechanical pressing force and the mechanical excitation. Such means can help during the step of arranging the fastener relative to the object and the substrate, for example by allowing for pre-assembling the fastener and object.

In embodiments in which the means for engagement are provided, a step of arranging the fastener relative to object can be prior to the step of arranging the object relative to the substrate and/or arranging the fastener relative to the object and to the substrate.

In an embodiment, the substrate provided includes a distal surface and the fastener provided as well as the step of applying the mechanical pressing force and the mechanical excitation can be such that the distal surface is unaffected by the method.

In particular, the mechanical excitation can be applied to the distal surface of the substrate and a force for advancing the at least one protrusion into the substrate can be applied to the fastener. Such an arrangement of mechanical excitation and force for advancing the protrusion(s) into the substrate can be used to generate a density profile in the substrate, in which the maximal densification is generated in region(s) neighboring the distal end of the protrusion(s) and not at the distal surface of the substrate.

The force for advancing the at least one protrusion into the substrate can be or cause the mechanical pressing force needed for liquefying the thermoplastic material.

In an embodiment, the substrate provided includes a thermoplastic material capable to liquefy when exposed to mechanical pressure and mechanical excitation as applied in the method. The step of applying the mechanical excitation can then include an at least partial liquefaction of the thermoplastic material of the substrate such that a weld is formed by the liquefied thermoplastic material of the substrate and liquefied thermoplastic material of the fastener after resolidification of the thermoplastic materials.

The meltability of the substrate can be such that the structure of the substrate changes.

For example, the substrate can include thermoplastic fibers, e.g., as disclosed above. Then, the thermoplastic fibers can melt together in the region around the protrusion(s) due to the impact of mechanical pressing force and mechanical excitation applied. In other words: the thermoplastic fibers connect in the region.

Such a change of the structure of the substrate can stiffen the region neighboring the protrusion in a manner that the critical compressive strength needed for the liquefaction of the thermoplastic material of the fastener is reached.

Such a change of the structure of the substrate also reinforces, in particular strengthens and stiffens, the bonding location between the fastener and the substrate. In other words, the quality of the bonding between the fastener and the substrate can be increased by the composition of the substrate.

At least one of the following features can be advantageous in order to promote the change in the structure of the substrate:
  A high concentration of thermoplastic material, for example thermoplastic fibers, in the region of the substrate that becomes the bonding location.
  The melting point of the thermoplastic material of the substrate is similar to or lower than the melting point of the thermoplastic material of fastener.
  Such a weld can also be formed in the object.

In embodiment in which the substrate includes, for example, natural or synthetic fibers that are embedded in a plastic, the plastic can be the thermoplastic material of the substrate.

For example, the substrate can be produced by a method including the steps of:
  Providing fibers of a first kind and fibers of a second kind, wherein the fibers of the first kind have a melting temperature that is lower than the melting temperature of the fibers of the second kind.
  Mixing the fibers of the first and second kinds, such that an assembly of fibers of the first and second kinds is generated.

Heating the assembly of fibers of the first and second kinds to such a temperature that the fibers of the first kind meld at least partly and embed the non-melting fibers of the second kind.

In an embodiment of the method in which a weld between the fastener and the substrate is formed, the weld can be formed between the thermoplastic material of the fastener and the fibers of the first kind (that flowed together), between the thermoplastic material of the fastener and the fibers of the second kind, or between the thermoplastic material of the fastener and both the fibers of the first and second kind.

In an embodiment, the fiber of the first kind includes or consists of Polypropylene.

The fastener can be a glass fiber reinforced plastic (e.g. Polypropylene) connector, for example.

If the fastener is a glass fiber reinforced plastic (e.g. Polypropylene) connector and the fibers of the first kind consist of the same plastic (e.g. Polypropylene), the location of the weld can be arranged easily by defining the location of maximum heating, e.g. by the shape of the coupling-out face, the shape of the coupling-in face and/or the use of energy directors.

The weld can be formed in addition to the interpenetration of liquefied thermoplastic material of the fastener into the structures of the substrate.

In an embodiment, the substrate is provided within a mold that is adapted to a desired shape of the substrate. The step of applying the mechanical pressing force and the mechanical excitation can be carried out on the substrate supported by the mold. This can avoid a deformation of the distal surface of the substrate due to pressure applied during the bonding of the fastener to the substrate.

The invention further concerns a fastener suitable for attaching the object to the substrate by the method in any embodiment.

The fastener can include any feature disclosed in relation to the fastener provided in the method according to any embodiment.

In particular, the fastener can include the fastener body including a proximal surface and a distal surface, at least one protrusion and thermoplastic material in a solid state. The protrusion protrudes from the distal surface of the fastener body and includes the thermoplastic material at outer surfaces. The fastener is equipped to transfer a movement of the fastener in a distal direction to a movement of the object in the distal direction.

The fastener can include a plurality of protrusions, for example the plurality of protrusions configured to establish the plurality of attachment locations needed to establish the tensioning force in the object.

The fastener can include the hold-down structure, in particular the hold-down structure that is or is configured to be a tension structure.

The protrusions can include a core of a harder material (as described above) around which the thermoplastic material is arranged.

Alternatively, the protrusion(s) or the protrusion(s) and the device body, in particular the fastener, consist of the thermoplastic material.

Each protrusion can taper towards one or more point, i.e. forming a tip or multi-tip, or towards a line, i.e. being ridge-like, wherein the line can be straight or bent. The protrusions can taper continuously or step-like.

The protrusions can form energy direction structures by their overall shape, for example by being tapered or by including steps and/or they can include a structure that serve as an energy director exclusively.

In any embodiment of the fastener, the fastener can further include at least one of:
- A stopping surface that limits the distal movement of the fastener. The stopping surface can be generated by the portion of the distal surface that does not support the protrusion(s), for example.
- A protrusion that includes a portion that is configured to engage with the engagement portion of the object and to generate a pulling force to the object via the engagement portion.
- The portion of the protrusion can be arranged and/or can be of a material such that it does not liquefy during the method.
- A projection arranged at a lateral surface of the at least one protrusion, wherein the projection is arranged and/or made of a material such that the projection does not liquefy during the method.

The fastener can include a cutting structure. In particular, the protrusion(s) can be formed to include the cutting structure.

In this text the expression "thermoplastic material being capable of being made flowable, e.g., by mechanical vibration" or in short "liquefiable thermoplastic material" or "liquefiable material" or "thermoplastic" is used for describing a material including at least one thermoplastic component, which material becomes liquid (flowable) when heated, in particular when heated through friction i.e. when arranged at one of a pair of surfaces (contact faces) being in contact with each other and vibrationally moved relative to each other, wherein the frequency of the vibration has the properties discussed below, for example. In some situations, for example if the fastener itself has to carry substantial loads, it may be advantageous if the material has an elasticity coefficient of more than 0.5 GPa. In other embodiments, the elasticity coefficient may be below this value, as the vibration conducting properties of the fastener thermoplastic material do not play a role in the process.

Thermoplastic materials are well-known in the automotive and aviation industry. For the purpose of the method according to the present invention, especially thermoplastic materials known for applications in these industries may be used.

A thermoplastic material suitable for the method according to the invention is solid at room temperature (or at a temperature at which the method is carried out). It preferably includes a polymeric phase (especially C, P, S or Si chain based) that transforms from solid into liquid or flowable above a critical temperature range, for example by melting, and re-transforms into a solid material when again cooled below the critical temperature range, for example by crystallization, whereby the viscosity of the solid phase is several orders of magnitude (at least three orders of magnitude) higher than of the liquid phase. The thermoplastic material will generally include a polymeric component that is not cross-linked covalently or cross-linked in a manner that the cross-linking bonds open reversibly upon heating to or above a melting temperature range. The polymer material may further include a filler, e.g., fibers or particles of material which has no thermoplastic properties or has thermoplastic properties including a melting temperature range which is considerably higher than the melting temperature range of the basic polymer.

In this text, generally a "non-liquefiable" material is a material that does not liquefy at temperatures reached during the process, thus especially at temperatures at which the thermoplastic material of the fastener is liquefied. This does not exclude the possibility that the non-liquefiable material would be capable of liquefying at temperatures that are not reached during the process, generally far (for example by at least 80° C.) above a liquefaction temperature of the thermoplastic material or thermoplastic materials liquefied during the process. The liquefaction temperature is the melting temperature for crystalline polymers. For amorphous thermoplastics the liquefaction temperature (also called "melting temperature in this text") is a temperature above the glass transition temperature at which the becomes sufficiently flowable, sometimes referred to as the 'flow temperature' (sometimes defined as the lowest temperature at which extrusion is possible), for example the temperature at which the viscosity drops to below $10^4$ Pa*s (in embodiments, especially with polymers substantially without fiber reinforcement, to below $10^3$ Pa*s)), of the thermoplastic material.

For example, non-liquefiable material may be a metal, such as aluminium or steel, or a hard plastic, for example a reinforced or not reinforced thermosetting polymer or a reinforced or not reinforced thermoplastic with a melting temperature (and/or glass transition temperature) considerably higher than the melting temperature/glass transition temperature of the liquefiable part, for example with a melting temperature and/or glass transition temperature higher by at least 50° C. or 80° C.

Specific embodiments of thermoplastic materials are: Polyetherketone (PEEK), polyesters, such as polybutylene terephthalate (PBT) or Polyethylenterephthalat (PET), Polyetherimide, a polyamide, for example Polyamide 12, Polyamide 11, Polyamide 6, or Polyamide 66, Polymethylmethacrylate (PMMA), Polyoxymethylene, or polycarbonateurethane, a polycarbonate or a polyester carbonate, or also an acrylonitrile butadiene styrene (ABS), an Acrylester-Styrol-Acrylnitril (ASA), Styrene-acrylonitrile, polyvinyl chloride (PVC), polyethylene, polypropylene, and polystyrene, or copolymers or mixtures of these.

In embodiments in which the fastener and at least one of the substrate and the object include thermoplastic material and no welding is desired, the material pairing is chosen such that the melting temperature of the substrate/object material is substantially higher than the melting temperature of the fastener material, for example higher by at least 50°. Suitable material pairings are for example polycarbonate or PBT for the fastener and PEEK for the substrate/object.

In addition to the thermoplastic polymer, the thermoplastic material may also include a suitable filler, for example reinforcing fibers, such as glass and/or carbon fibers. The fibers may be short fibers. Long fibers or continuous fibers may be used especially for portions of the fastener and/or of the substrate that are not liquefied during the process.

The fiber material (if any) may be any material known for fiber reinforcement, especially carbon, glass, Kevlar, ceramic, e.g. mullite, silicon carbide or silicon nitride, high-strength polyethylene (Dyneema), etc.

Other fillers, not having the shapes of fibers, are also possible, for example powder particles.

Mechanical vibration or oscillation suitable for the method according to the invention has preferably a frequency between 2 and 200 kHz (even more preferably ultrasonic vibration having a frequency between 10 and 100 kHz, or between 20 and 40 kHz) and a vibration energy of 0.2 to 20 W per square millimeter of active surface. The vibrating tool (sonotrode) is e.g. designed such that its contact face oscillates predominantly in the direction of the tool axis (longitudinal vibration) and with an amplitude of between 1 and 100 μm, preferably around 30 to 60 μm. Such preferred vibrations are e.g. produced by ultrasonic devices as e.g. known from ultrasonic welding.

BRIEF DESCRIPTION OF THE DRAWINGS

Hereinafter, embodiments of the invention are described referring to drawings. The drawings are all schematic and not to scale. In the drawings, same reference numbers refer to same or analogous elements. The drawings are used to explain the invention and embodiments thereof and are not meant to restrict the scope of the invention. Terms designating the orientation like "proximal", "distal", etc. are used in the same way for all embodiments and drawings.

The drawings show:

FIGS. 1a-1c Sectional views of a fastener, an object and a substrate, wherein the fastener is used to attach the object to the substrate. Three stages of an exemplary method according to the invention are shown;

FIGS. 2a and 2b Two stages of another exemplary method of attaching the object to the substrate by the fastener in sectional views;

FIGS. 6-8 An exemplary embodiment of a fastener used in the method according to FIGS. 3-5;

FIG. 9 An alternative embodiment of a fastener suitable for use in the method;

FIGS. 10a-10c Further embodiments of the fastener including a structure for promoting local compression of the substrate;

DETAILED DESCRIPTION OF THE INVENTION

Figure 3:
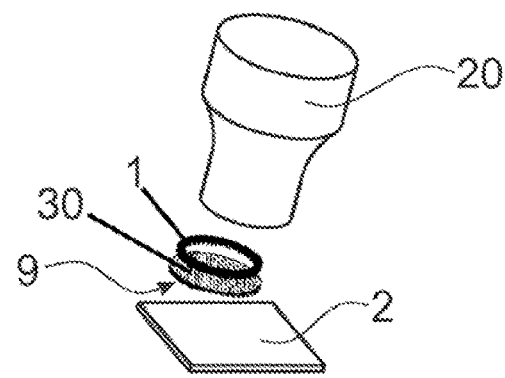
FIG. 3 An initial situation of an exemplary embodiment of the method.

FIGS. 1a-1c show the relative arrangement and interaction of a fastener (1), an object (30) and a substrate (2) at three different stages of an exemplary embodiment of the method.

A method according to the invention includes providing the fastener 1 including at least one protrusion 9 with thermoplastic material 3 in a solid state, providing the substrate 2 having a proximal surface and providing the object 30 that is to be attached to the substrate 2 by the use of the fastener and that is tensible and includes an engagement portion 38. The method includes further arranging the fastener 1, the object 30 and the substrate 2 relative to each other such that an engagement portion 38 of the object 30 is between at least a portion of the fastener 1 and the substrate 2. The method further includes applying a mechanical pressing force and a mechanical excitation to at least one of the fastener 1 and the substrate 2, wherein the mechanical pressing force and as the case may be the mechanical excitation are capable to cause a movement of the fastener 1 in a distal direction in a manner that the at least one protrusion 9 penetrates the proximal surface 4 of the substrate 2 and wherein the mechanical pressing force and the mechanical excitation are capable to liquefy the thermoplastic material 3 until a flow portion of the thermoplastic material is flowable and penetrates into structures 10 of the substrate 2 prior to stopping the mechanical excitation and letting the thermoplastic material resolidify to yield a positive-fit connection between the fastener 1 and the substrate 2.

FIGS. 1*a* and 1*b* show the situation during the step of causing the movement of the fastener in the distal direction.

In FIG. 1*a*, the fastener 1 has not yet engaged with the engagement portion 38 of the object 30 in a manner that the distal movement of the fastener 1 has caused a distal movement of the engagement portion. Hence, the object 30 is not yet tensioned because there is no tensioning force generated by the movement of the fastener and the engagement portion, respectively.

In FIG. 1*b*, the fastener 1 interacts with the engagement portion 38 in a manner that the distal movement of the fastener 1 pulls the engagement portion 38 in the distal direction. Portions of the object 30 that are different from the engagement portion 38 cannot move distally or can move distally up to a reduced path only, because the proximal surface 4 of the substrate prevents the portion from following the engagement portion 38. Hence, the object 30 is stretched (tensioned) by a tensioning force (indicated by the black arrow in the Figures) generated by a relative movement between the engagement portion 38 and other portions of the object 30.

FIG. 1*c* shows the situation during the step of applying the mechanical pressing force (indicated by the empty arrow) and the mechanical excitation (indicated by the double-sided arrow) to liquefy the thermoplastic material 3 at least partly and to press liquefied thermoplastic material into structures 10 of the substrate 2.

A protruding portion 91 is not liquefied during the step or does at least not penetrate into the structures 10 of the substrate 2 in order to cause deep-effective anchorage.

The anchorage of the fastener established after resolidification of the thermoplastic material 3 fixes the relative position of the engagement portion 38 relative to the portions of the object 30 that are different from the engagement portion 38. Hence, the tensioning force is maintained after execution of the method.

FIG. 1*a*-1*c* show further the following optional features:

A compressed region 201. In the embodiment shown, the compression is mainly caused by the protrusion 9. This means the compression is local mainly. However, the object 30 contributes to the compressed region 201 by causing a global compression.

The substrate 2, or at least the portion of the substrate 2 in which the bonding between the fastener 1 and the substrate 2 is established, is compressible.

FIGS. 2*a* and 2*b* show two exemplary embodiments, wherein the substrate, or at least the portion of the substrate 2 in which the bonding between the fastener 1 and the substrate 2 is established, is not compressible.

In the embodiment shown, the engagement portion 38 engages with a distal portion of the fastener 1 in a manner that moves in the distal direction together with the protrusion 9. In other words, at least a portion of the engagement portion 38 does not move relative to the protrusion 9 during the step of causing a movement of the fastener 1 in a distal direction, at least. In particular, at least a portion the engagement portion 38 penetrates the proximal surface 4 together with the protrusion 9.

As in the embodiment of FIGS. 1*a*-1*c*, the proximal surface 4 prevents that portions of the object 30 that are different from the engagement portion 38 follow the engagement portion 38. Hence, the object 30 is stretched (tensioned) by the tensioning force (indicated by the black arrow in the Figures) generated by the relative movement between the engagement portion 38 and the portions of the object 30 that are different from the engagement portion 38.

FIG. 2*a* shows the situation during the step of forcing the protrusion 9 into the substrate 2. FIG. 2*b* shows the situation during the step of liquefying at least a portion of the thermoplastic material by the mechanical pressing force (indicated by the empty arrow in the Figures) and by the mechanical excitation (indicated by the double-sided arrow).

FIGS. 2*a* and 2*b* show further the following optional features:

A ratio between the length and the thickness of the fastener 1 that is larger than 1. Therein, the length is given by the extension 25 of the fastener in distal direction and the thickness 26 is given by an extension of the protrusion 9 in a direction perpendicular to the distal direction.

A ratio between the depth 95 up to which the protruding portion 91 penetrates into the substrate 2 and a thickness 96 of the protruding portion 91 that is larger than 1. Therein, the depth 95 is measured along the distal direction and the thickness 26 is given by an extension of the protruding portion 91 in a direction perpendicular to the distal direction.

FIGS. 3-9 show configuration and devices of a further exemplary method.

In particular, the method and fastener 1 shown are capable in the application of fixing an object 30 being the hook portion of a hook and loop tape to the substrate 2.

Figure 4:
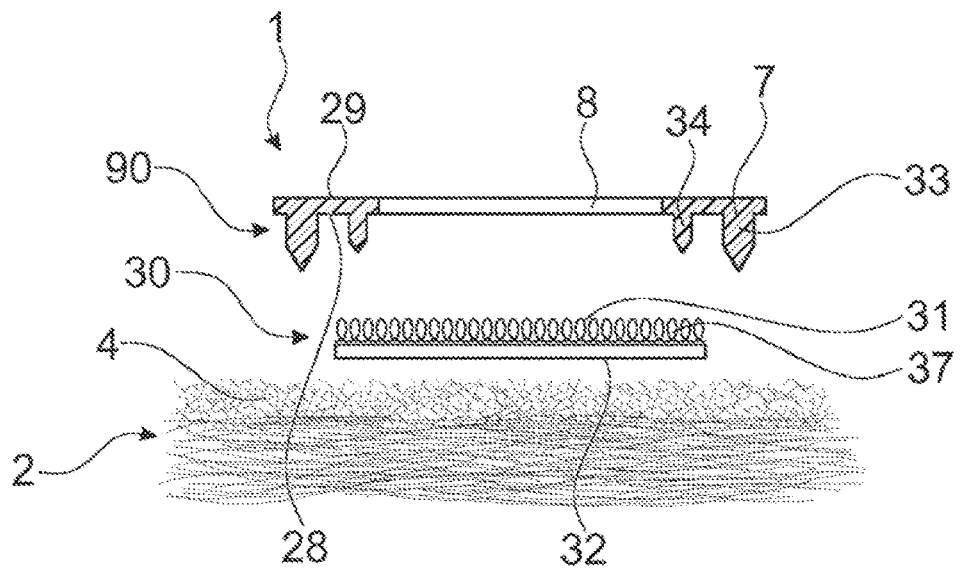
FIG. 4 The arrangement and character of the fastener, the object and the substrate at the beginning of the method according to FIG. 3.
Figure 5:
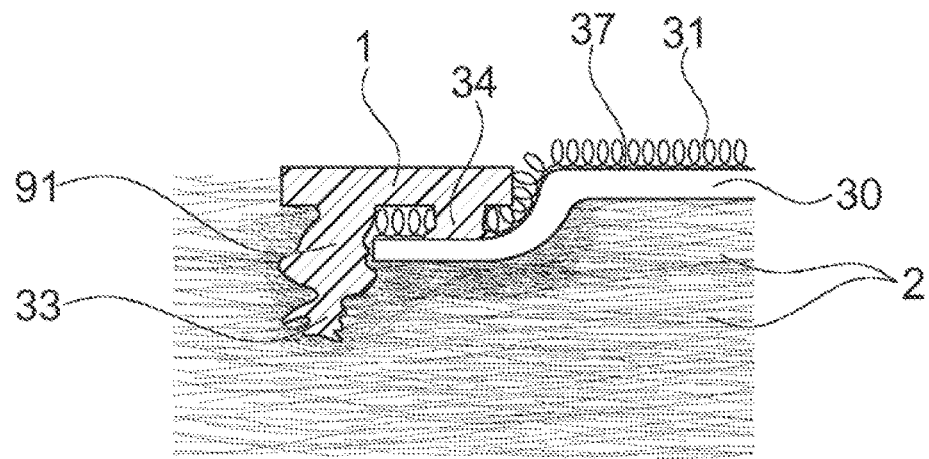
FIG. 5A bonding location established by the method according to FIGS. 3 and 4.

In the embodiment shown in FIGS. 3-5, the hook and loop tape is of the "Velcro"-type. However, the method and fastener disclosed can be used for other objects 30 having similar properties and/or a similar structure than the hook portion.

FIG. 3 shows the general concept of this application.

The hook portion 30 includes a hook area 37 that forms a proximal surface 31 of the hook portion 30.

The fastener 1 is designed to clamp the hook portion 30 to the substrate 2 by the method. In other words, the fastener 1 is designed to yield a positive-fit connection between the fastener and the substrate 2 using the method and to clamp the hook portion 30 to the substrate 2.

A sonotrode 20 is used to apply the mechanical pressing force and the mechanical excitation, this means the mechanical oscillations in the application shown, to liquefy the flow portion of the thermoplastic material arranged at the protrusions 9.

FIG. 4 shows a cross-sectional view of an embodiment of the application before fixing the hook portion 30 to the substrate 2 by the fastener 1.

In the embodiment shown, the fastener 1 has a fastener body 7 of a closed shape that forms an opening 8. The opening 8 is designed in a manner that the proximal surface 31 of the hook portion 30 (this means the hook area 37) is exposed (lies open) after fixing the hook portion 30 to substrate 2 by the fastener 1.

The fastener 1 includes protrusions 33 of a first kind and protrusions 34 of a second kind. The protrusions of the first and second kind differ in thickness and length, wherein the protrusions 33 of the first kind are larger in thickness and length than the protrusions 34 of the second kind.

In the embodiment shown, the protrusions 34 of the second kind consist of thermoplastic material 3.

The shape of the fastener body 7, the shape of the hook portion 30, and the arrangement of the protrusions (33, 34) are adapted to each other in a manner that a circumferential edge of the hook portion 30 is between the protrusions of the first and second kind after arranging the fastener 1, the substrate 2 and the hook portion 30 in the desired manner. In other words, the distal end of the protrusions 33 of the first kind is in contact with the proximal surface 4 of the substrate 2 and the distal end of the protrusions 34 of the second kind is in contact with the object proximal surface 31.

The design and arrangement of the fastener 1 and the hook portion 30 according to FIG. 4 is particularly suitable for a reliable attachment of the hook portion 30 to the substrate 2.

However, there are applications in which it may be advantageous to design and arrange the fastener 1 and the object 30, for example the hook portion, in a manner that:
- Both, the row of the protrusions 33 of the first kind and the row of the protrusions 34 of the second kind engage with the object 30; or
- There is only one row of protrusions. The row of protrusion can engage with the substrate 2 directly or by penetrating the object 30. If the row of protrusion engages with the substrate 2 directly, the fastener body 7 can include a distal surface portion arranged to cause the movement of the engagement portion 38 of the object 30 in distal direction.

Embodiments including one row of protrusions only or including two rows of protrusions of a different kind do not need to include a fastener 1 having a fastener body 7 of a closed shape that forms an opening 8 as shown in FIG. 4. In other words, the fastener 1 does not need to be a fixation ring or a fixation rectangle as shown in FIGS. 4-9. Rather, the fastener 1 can have any shape suitable for a specific application.

One can also envisage using at least one fastener 1 including at least one protrusion that is designed to engage with the substrate 2 directly or by penetrating the object 30.

The most promising design and arrangement of the fastener 1 and the object 30 can depend on the application and/or the strength of the connection between the object 30 and the substrate 2 needed. However, it can also depend on at least one of the properties of the material(s) of which the object 30 is made, the design of the protrusions, and/or the manner the step of applying the mechanical pressing force and the mechanical excitation is performed.

For example, an embodiment including at least one fastener 1 including at least one protrusion 9 or a fastener 1 including one row of protrusions only, the protrusion or row of protrusion engages with the object 30 can be suitable if the object 30, for example the hook portion, is made of fibers that are stable at the temperatures generated during the method and mechanically stable in a manner that at least a portion of the fibers of the engagement portion 38 is not cut during the method. The manner the step of applying the mechanical pressing force and the mechanical excitation is performed can be adapted to the stability of the fibers.

Alternatively or in addition, the protrusion(s) 9 can be designed to move through the object 30 without cutting a plurality, in particular without cutting a majority, of the fibers of the engagement portion 38. For example, the protrusion(s) 9 can be pin-shaped.

Alternatively or in addition, the object 30 can have a density that allows for the material of which the object 30 is made, for example fibers and/or meshes, to be pushed away by the penetrating protrusion(s) 9 rather than being cut by the penetrating protrusion(s) (9).

FIG. 5 shows the embodiment of the application of FIG. 4 after fixing the hook portion 30 to the substrate 2 by the fastener 1, in detail.

The protrusions 33 of the first kind have penetrated into the substrate 2, wherein the flow portions of the protrusions 33 of the first kind have penetrated into structures 20 of the substrate 2 and wherein the protruding portions 91 have been formed.

The protrusions 34 of the second kind have liquefied during the step of applying the mechanical pressing force and the mechanical excitation (the mechanical oscillations, in the case shown). Thereby, the portions of the hook area 37 in the region of former protrusions 34 of the second kind are embedded in the re-solidified thermoplastic material. This causes a fixation of the hook portion 30 to the fastener 1 that is more reliable than a fixation by clamping only.

In the embodiments shown in the Figures, the engagement portion 38 is the portion of the object 30 that comes into contact with the fastener 1, wherein the engagement portion 38 is of the same kind, for example the same material, structure, etc., as other portions of the object 30. However, one can also envisage an engagement portion 38 that differs from other portions of the object 30. For example, the engagement portion 38 can be of a material and/or designed to be mechanically more stable to withstand forces that appear during the method or during use of an item including the object 30 that is attached to the substrate 2 by the fastener 1.

FIG. 6a shows an embodiment of the fastener 1 used in the application according to FIGS. 3-5. The fastener body 7 has the shape of a circular ring that delimits the opening 8.

A fastener 1 according to FIG. 6a causes a tensioning field in the object 30 with field lines running along radial direction only. Hence, the fastener 1 according to FIG. 6a is in particular suitable for objects 30 with isotropic deformation properties. FIG. 6b shows an alternative embodiment of a fastener 1 that is in particular suitable for objects 30 with isotropic deformation properties. The dashed lines in FIG. 6b indicate the relative arrangement of the protrusions 9 and the radial directions along with the field lines of the generated tensioning field run.

FIG. 7 shows the fastener 1 according to FIG. 6a in detail and FIG. 8 shows a cross-sectional view through a protrusion 33 of the first kind and a protrusion 34 of the second kind.

The protrusions 33 of the first kind are arranged as an outer ring on the fastener body 7 and the protrusions 34 of the second kind are arranged as an inner ring on the fastener body 7.

The outer ring of protrusions 33 is designed for being anchored in the substrate 2 by the method.

The inner ring of protrusions 34 is designed for tautening the hook portion 30 during the method and for holding the hook portion 30 after fixing the hook portion 30 to the substrate 2 by the fastener.

The protrusions 9 are arranged in the outer and inner ring along radial directions. Such an arrangement of the protrusions 34 of the second kind leads to a concentric pulling force acting on the hook portion 30 during bonding of the fastener 1 to the substrate 2. Hence it prevents folding, for example.

Protrusions 34 of the second kind can include at least one of the following features in order to fulfill their function of tautening and fixing the hook portion 30:

The distal end of the protrusions 34 of the second kind can be an edge that runs along a radial direction of the fastener body 7 having the shape of a circular ring. The edge can include a slope that is oriented towards the center of the circular ring.

The distal end of the protrusions 34 of the second kind can be rounded in order to prevent damage of the hook portion 30.

The protrusions 34 of the second kind can be thinner than the protrusions 33 of the first kind. Consequently, they liquefy and/or collapse during the step of applying the mechanical pressing force and the mechanical excitation (the mechanical oscillations, in the case shown) causing embedding of the hook portion 30 rather than cutting the hook portion 30.

The protrusions 34 of the second kind can include fixing spikes as an optional feature. Fixing spikes can engage with the hooks in the hook area 37. Fixing spikes allow for a pre-assembly of the hook portion 30 and the fastener 1. Therefore, they can be advantageous in a step of arranging the fastener 1, the substrate 2 and the hook portion 30 in the desired manner prior to the step of applying the mechanical pressing force and the mechanical excitation (the mechanical oscillations, in the case shown).

The overall design of the fastener 1 can be adapted to the object 30 to be fixed, in particular its shape and structure, and to the concrete application.

In particular, the fastener body 7 can have another shape than the shape of a circular ring.

The protrusions 9 can be arranged differently from the arrangement shown in FIGS. 6 and 7 on the distal surface 28 of the fastener body 7.

The fastener 1 can include protrusions 9 of one kind only.

FIG. 9 shows a further design of a fastener 1 for fixing an object 30 to the substrate 2 by the method, in particular a fastener 1 suitable for the application discussed with respect to FIGS. 3-8.

The fastener 1 shown includes protrusions 9 of one kind only arranged in a protrusion region 90 covering the whole distal surface 28 of the fastener body 7.

The distal ends of the protrusions 9 are formed by an edge. The edges are oriented parallel to each other.

Further, the number of protrusions 9 per unit area is increased compared to the fasteners shown in FIGS. 6-9, for example.

Such an arrangement of protrusions 9 and/or an increase in protrusions 9 per unit area can be advantageous for objects 30 that are fluffy, slack and/or highly stretchable. Textiles are examples of such objects 30.

FIGS. 10a-c do not only increase locally the density of substrate 2 by the protrusion displacing material of the substrate 2 but also by including structures 24 that are designed and arranged to promote local compression of the substrate 2.

The structures 24 shown in FIGS. 10a-c are designed and arranged to pull down fibrous material of the substrate 2 and/or to felt such material further and/or to embed the protrusions 9 including such structures 24 better in the material of the substrate 2, for example for distributing load over a larger area.

The embodiments of the fastener 1 shown in the FIGS. 10a and 10b include so-called barbs 24, i.e., structures that have a shape and are arranged at the protrusion 9 such that they are capable to increase the density of the substrate 2 faced by the protrusion 9 in function of a penetration depth of the protrusion 9.

The barbs 24 can be arranged at a distal end of the protrusion 9, as shown in FIG. 10a. This leads to a local compression of the substrate 2 that favours the liquefaction of the thermoplastic material 3 arranged around the distal end of the protrusion 9.

Alternatively or in addition, the barbs 24 can be arranged at the lateral side of the protrusion 9. As an example, FIG. 10b shows drag down barbs that are small compared to the size of the protrusion 9.

There is no need for a homogenous distribution of the barbs 24 at the lateral side. Rather, the barbs 24 can be arranged such that the liquefaction of the thermoplastic material 3 sets in at certain positions on the protrusion 9 and/or that the penetration of the substrate 2 by liquefied thermoplastic material is restricted along a specific direction.

In FIG. 10c, the structure 24 designed and arranged to promote local compression of the substrate 2 is given by the shape of the distal end of the protrusion, in particular by having multiple tips that cause catching of fibers, for example.

In particular, barbs are suitable for use in fibrous substrates 2 where they can collect fibers during penetration and hence increase the density of fibers around the protrusion 9.

The barbs can be made of the thermoplastic material 3 or a harder material.

Barbs made of the thermoplastic material 3 can further increase the embedding of the protrusion 9 and the protruding portion 91, respectively.

Figure 11A:
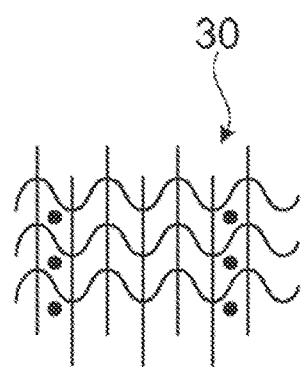
FIGS. 11a and 11b A schematic of an object having anisotropic deformation properties and of a fastener adapted to the anisotropic deformation properties.

FIG. 11a shows an object 30 that includes anisotropic deformation properties. In other words, the object 30 is more tensible along a first direction than along a second direction. In the embodiment shown, the object 30 includes fibers that are bent along the first direction and stretched along the second direction.

FIG. 11a further indicates possible engagement location by black points.

Figure 11B:
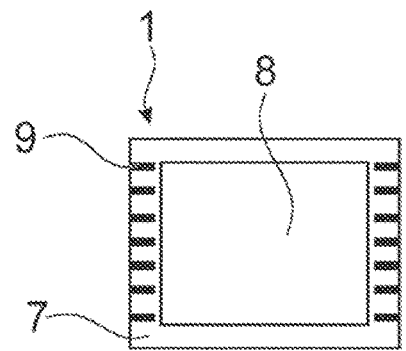

FIG. 11b shows an exemplary fastener 1 that is adapted to the anisotropic deformation properties of the object 30 according to FIG. 11a. The protrusions 9 are arranged on a portion of the fastener body 7, only. Further, the protrusions 9 are arranged relative to each other in a manner that a homogeneous tensioning field along the first direction is generated during the method and after attachment of the object 30 to the substrate 2 by the fastener 1 shown.

Figure 12:
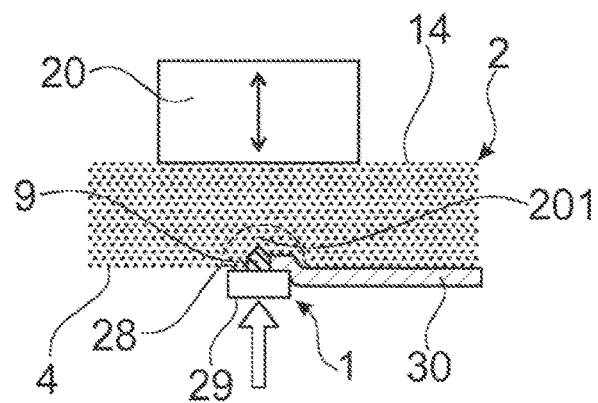
FIG. 12 An embodiment of the method in which a sonotrode is applied to the substrate and a force for advancing the protrusion into the substrate is applied to the fastener.

FIG. 12 shows a variation of the method in which the substrate 2 is placed between the fastener 1 and the sonotrode 20.

According to this variation, any force for advancing the protrusion(s) 9 into the substrate 2 is applied to the fastener 1 (indicated by the arrow below the fastener 1).

The sonotrode 20 is in contact to the distal surface 14 of the substrate 2 and couples mechanical oscillations into the substrate 2. Further, it acts as a support for the substrate 2, but it does not push actively the substrate 2 towards the fastener 1.

This arrangement of applying the sonotrode to the substrate 2 and any pushing force to the fastener 1 has the effect that the compressed region 201 is generated around the protrusion(s), wherein the compression of the distal surface 14 of the substrate 2 is kept minimal.

Figure 13:
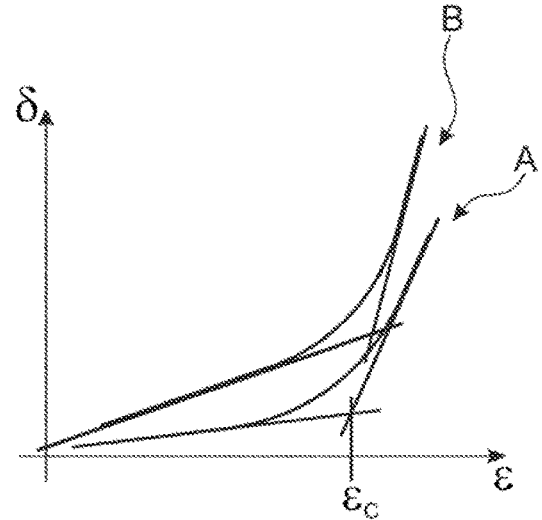
FIG. 13 Two representative stress-strain-curves for a panel formed by an incoherent material.

FIG. 13 shows two stress-strain-curves (A and B) that are representative for the experimental results that led to the surprising finding that various incoherent materials are suitable for use in bonding methods relying on the liquefaction of thermoplastic material by the use of a mechanical pressing force and a mechanical excitation, in particular vibrations.

The relative behaviour of stress-stain curves A and B shows the influence of a changing surface via which load is applied to the material. The indenter of curve B has a larger surface area in contact with the material that the indenter of curve A.

FIG. 13 shows the observed first region in which the stress depends approximately linear on strain, the observed transition region and the observed second region in which the stress depends approximately linear on strain.

The straight lines that approximate the approximately linear dependence in the different regions of linear dependencies are represented as dashed lines.

The strain $\varepsilon_c$ at which the slope of the first region of approximately linear dependency and the slope of the second region of approximately linear dependency cross is a characteristic value of the stress-strain behaviour of the material. The characteristic value can be used to define a minimal compression needed in embodiments of the method in which the positive-fit connection is to be established in a substrate material that does—when not compressed—not generate the stress needed for liquefaction of the thermoplastic material.

Figure 14:
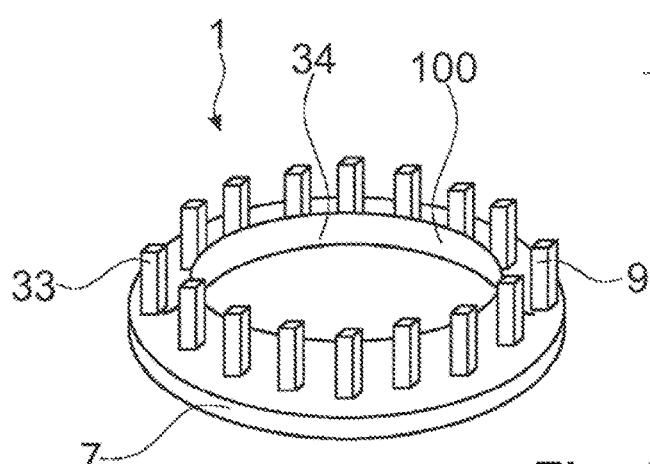
FIG. 14 An exemplary embodiment of a fastener including a tension structure.

FIG. 14 shows an exemplary embodiment of a fastener 1 including a tension structure 100.

The exemplary embodiment shows a fastener 1 in the shape of a fixation ring including at its distal side an outer ring of protrusions 9, this means of fixation protrusions, and an inner tension ring 100.

The embodiment of FIG. 14 is a variant of the embodiment shown in FIGS. 6a, 7 and 8, wherein the fixation protrusions 9 are the protrusions 33 of the first kind arranged as the outer ring on the fastener body and the tension ring 100 is a protrusion 34 of the second kind arranged as an inner ring on the fastener body.

What is claimed is:

1. A method of attaching an object to a substrate, the method comprising the steps of:
   providing the object, wherein the object is a tensible fabric and comprises an engagement portion,
   providing the substrate comprising a proximal surface,
   providing a fastener, said fastener comprising a fastener body having a proximal surface and a distal surface, wherein the fastener comprises at least one protrusion protruding from the distal surface, the at least one protrusion comprising thermoplastic material in a solid state,
   wherein the fastener body is shaped to form a closed shape delimiting an opening;
   arranging the fastener, the object and the substrate relative to each other in a manner that the engagement portion of the object is between at least a portion of the fastener and the substrate, and such that the fastener body extends around the object and a portion of the object is accessible through the opening,
   applying a mechanical pressing force and a mechanical excitation capable to cause a movement of the fastener in a distal direction such that the at least one protrusion penetrates the proximal surface of the substrate and to liquefy a flow portion of the thermoplastic material of the at least one protrusion until the flow portion of the thermoplastic material is flowable and penetrates into structures of the substrate,
   stopping the mechanical excitation and letting the flow portion of the thermoplastic material resolidify to yield a positive-fit connection between the fastener and the substrate, with a protruding portion of the fastener extending at least partly into the substrate,
   wherein the engagement portion is moved in the distal direction by the movement of the fastener, and
   wherein the movement of the engagement portion in the distal direction causes a tensioning force in the object, stretching the object over the substrate.

2. The method according to claim 1, wherein the protruding portion extends to a depth in the substrate that is larger than a thickness of the protruding portion.

3. The method according to claim 1,
   wherein the step of applying the mechanical pressing force and the mechanical excitation comprises a first sub-step of causing the at least one protrusion to penetrate the proximal surface and to penetrate into the substrate, and a second sub-step of liquefying the thermoplastic material,
   wherein the first sub-step is prior to the second sub-step, and
   wherein the engagement portion is engaged with the fastener during the first sub-step in a manner that the fastener is moved in the distal direction.

4. The method according to claim 3, wherein the engagement portion is engaged with the at least one protrusion in a manner that it the at least one protrusion penetrates the proximal surface.

5. The method according claim 3, wherein the proximal surface is made of a material that is compressible.

6. The method according to claim 5, wherein the engagement portion is engaged with the fastener in a manner that a penetration of the proximal surface by the engagement portion is prevented.

7. The method according to claim 1, wherein the proximal surface is made of a material that is not compressible.

8. The method according to claim 1, wherein the method comprises a step of changing a compressive strength in a region of the substrate at least locally such that a critical compressive strength needed for the liquefaction of the thermoplastic material is generated.

9. The method according to claim 1, wherein the method comprises a step of compressing a region of the substrate at least locally such that a critical density needed for the liquefaction of the thermoplastic material is generated.

10. The method according to claim 1, wherein a ratio between an extension of the at least one protrusion in the distal direction and a thickness of the protrusion is at least 1.

11. The method according to claim 1, wherein the step of applying the mechanical excitation comprises applying mechanical oscillations along an axis that is perpendicular to the proximal surface.

12. The method according to claim 1, wherein the mechanical excitation is mechanical vibration.

13. The method according to claim 1,
   wherein a first fastener and a second fastener are provided,
   wherein the object comprises a first engagement portion and a second engagement portion, and
   wherein the tensioning force in the object is caused by:
   a simultaneous movement of the first and second engagement portions in distal direction; or
   the movement of the second engagement portion, wherein a fixation of the first engagement portion to the substrate is established by the first fastener prior to the step of applying a mechanical pressing force and a mechanical excitation to the second fastener.

14. The method according to claim 1, wherein the object comprising an object proximal surface and an object distal surface and the steps of:
arranging the object relative to the substrate such that the object distal surface is in physical contact with the proximal surface of the substrate;
arranging the fastener relative to the object and the substrate such that the protrusion is at least partly in contact with the proximal surface of the substrate and such that the distal surface of the fastener is in contact with the object proximal surface.

15. The method according to claim 14,
wherein the at least one protrusion that is put in contact with the proximal surface of the substrate during the step of arranging the fastener relative to the object and the substrate comprises the thermoplastic material, and
wherein the protrusion and the distal surface of the fastener are designed such that the flowable portion of the thermoplastic material penetrates into the structures of the substrate during the step of applying the mechanical pressing force and the mechanical excitation and such that the distal surface of the fastener is not able to penetrate the object.

16. The method according to claim 14, wherein the distal surface of the fastener and the portion of the object proximal surface that is put in contact with the distal surface of the fastener are designed to engage with one another.

17. The method according to claim 14,
wherein the at least one protrusion that is put in contact with the proximal surface of the substrate during the step of arranging the fastener relative to the object and the substrate is a first protrusion, and
wherein the fastener comprises a second protrusion comprising the distal surface of the fastener that is in contact with the object proximal surface during the step of arranging the fastener relative to the object and substrate.

18. The method according to claim 17,
wherein the first protrusion is a protrusion of a first kind comprising the thermoplastic material and the second protrusion is a protrusion of a second kind comprising the thermoplastic material,
wherein the shape of the protrusion of the first kind is such that the flow portion of the thermoplastic material penetrates into the structures of the substrate, and
wherein the shape of the protrusion of the second kind is such that a flowable portion of the thermoplastic material penetrates into structures of the object during the step of applying the mechanical pressing force and the mechanical excitation capable to liquefy the thermoplastic material.

19. The method according to claim 1,
wherein the substrate comprises a distal surface, and
wherein the mechanical excitation is applied to the distal surface of the substrate and a force for moving the fastener in the distal direction is applied to the fastener.

20. The method according to claim 1,
wherein the step of providing the substrate comprises providing a substrate comprising thermoplastic material, and
wherein said thermoplastic material liquefies at least partly during the step of applying the mechanical excitation such that a weld is formed between said liquefied thermoplastic material and liquefied thermoplastic material of the fastener after resolidification of the thermoplastic materials.

21. The method according to claim 1,
wherein the object comprises anisotropic deformation properties, and
wherein at least one of a design of the at least one fastener, a number of fasteners and an arrangement of the at least one fastener relative to the object is adapted to the anisotropic deformation properties of the object.

22. The method according to claim 1, wherein the fastener body is shaped as a ring that delimits the opening.

23. The method according to claim 22,
wherein the protrusion comprises the thermoplastic material at outer surfaces,
wherein the fastener is equipped to transfer a movement in the distal direction to a movement of the object in the distal direction, and
wherein the at least one protrusion includes protrusions of a first kind and protrusions of a second kind, wherein the protrusions of the second kind are smaller in length than the protrusions of the first kind, and wherein the protrusions of the first kind are arranged as an outer ring on the distal surface of the fastener body and the protrusions of the second kind are arranged as an inner ring on the distal surface of the fastener body.

24. The method according to claim 23,
wherein the protrusions of the first kind are adapted to be anchored in the substrate and the protrusions of the second kind are adapted to engage with the object.

25. The method according to claim 23, wherein the at least one protrusion consists of the thermoplastic material.

26. The method according to claim 23, wherein the protrusions of the first kind comprise a structure designed and arranged to promote local compression of the substrate when forced into the substrate.

27. The method according to claim 23,
wherein the at least one protrusion have an extension in the distal direction and a thickness, and
wherein a ratio between the extension in distal direction and the thickness is at least 1.

28. The method according to claim 23, wherein the fastener comprises a protrusion region comprising said first and second kinds of protrusions.

29. The method according to claim 23, wherein at least one of a design of the at least one protrusion, a number of protrusions and an arrangement of the at least one protrusion is suitable to generate an anisotropic tensioning force in the object when the object is attached to the substrate by the method.

30. The method according to claim 22, wherein the fastener body is shaped as a circular ring.

31. A method of attaching an object to a substrate, the method comprising the steps of:
providing the object, wherein the object is a tensible fabric and comprises an engagement portion,
providing the substrate comprising a proximal surface,
providing a fastener, wherein the fastener comprises at least one protrusion, wherein the at least one protrusion comprises thermoplastic material in a solid state,
arranging the fastener, the object and the substrate relative to each other such that the engagement portion of the object is between at least a portion of the fastener and the substrate,
applying a mechanical pressing force and a mechanical excitation capable to cause a movement of the fastener in a distal direction such that the at least one protrusion penetrates the proximal surface of the substrate and to liquefy the thermoplastic material to at least one of the fastener and the substrate until a flow portion of the thermoplastic material is flowable and penetrates into structures of the substrate, stopping the mechanical excitation and letting the thermoplastic material resolidify to yield a positive-fit connection between the fastener and the substrate, wherein the engagement portion is moved in the distal direction by the movement of the fastener, wherein the movement of the engagement portion in the distal direction causes a tensioning force in the object, stretching the object over the substrate, wherein the fastener comprises a protruding portion extending at least partly into the substrate after the step of letting the thermoplastic material resolidify, wherein the mechanical pressing force and the mechanical excitation are applied locally to at least one of the fastener and the substrate and wherein the step of applying the mechanical pressing force and the mechanical excitation and the step of stopping the mechanical excitation and letting the thermoplastic material resolidify is repeated several times at different positions on at least one of the fastener and the substrate.

32. A method of attaching an object to a substrate, the method comprising the steps of:

providing the object, wherein the object is a tensible fabric and comprises an engagement portion, providing the substrate comprising a proximal surface of a fibrous material, providing a fastener, wherein the fastener comprises at least one protrusion, wherein the at least one protrusion comprises thermoplastic material in a solid state, arranging the fastener, the object and the substrate relative to each other in a manner that the engagement portion of the object is between at least a portion of the fastener and the substrate, applying a mechanical pressing force and a mechanical excitation capable to cause a movement of the fastener in a distal direction such that the fastener acts to move the engagement portion in the distal direction and to compress a first portion of the fibrous material of the substrate, wherein the first portion of the fibrous material extends at least partly underneath the engagement portion, whereas a second portion of the fibrous material of the proximal surface of the substrate different of the first portion is not compressed or compressed to a lesser extent, and such that the at least one protrusion penetrates the proximal surface of the substrate and a flow portion of the thermoplastic material of the at least one protrusion is flowable and penetrates into the first portion of the fibrous material, stopping the mechanical excitation and letting the thermoplastic material resolidify to yield a positive-fit connection between the fastener and the substrate, with the re-solidified flow portion interpenetrating compressed fibrous material of the substrate, wherein the movement of the engagement portion in the distal direction with the second portion of the fibrous material not being compressed or being compressed to a lesser extent than the first portion causes a tensioning force in the object, stretching the object over the substrate.

* * * * *